United States Patent [19]

Murphy et al.

[11] Patent Number: 5,169,782

[45] Date of Patent: Dec. 8, 1992

[54] APPARATUS AND METHOD FOR PROCESSING ORGANIC REFUSE

[75] Inventors: John E. Murphy, Paoli; William K. Reynolds, Orleans; C. Neil Ott, North Salem, all of Ind.

[73] Assignee: Rey Tech, Inc., Orleans, Ind.

[21] Appl. No.: 654,255

[22] Filed: Feb. 12, 1991

[51] Int. Cl.$^5$ .............................................. B01J 8/00
[52] U.S. Cl. ..................................... 435/312; 71/12; 71/25; 435/287
[58] Field of Search ................ 422/184; 435/287, 312; 71/12, 13, 14, 25

[56] References Cited

U.S. PATENT DOCUMENTS

| | | |
|---|---|---|
| 700,842 | 5/1902 | Smith . |
| 2,593,867 | 4/1952 | Eweson ................................. 34/174 |
| 2,680,069 | 6/1954 | Eweson ....................................... 71/9 |
| 2,954,285 | 9/1960 | Carlsson et al. ........................... 71/9 |
| 3,138,447 | 6/1964 | Eweson ....................................... 71/9 |
| 3,235,369 | 2/1966 | Eweson ....................................... 71/9 |
| 3,245,759 | 4/1966 | Eweson ................................. 23/259.1 |
| 3,561,943 | 2/1971 | Gay, Jr. et al. ............................. 71/9 |
| 3,676,074 | 5/1970 | Shibayama et al. ............... 23/259.1 |
| 3,814,588 | 6/1974 | Eweson ................................. 23/259.1 |
| 3,930,799 | 1/1976 | Eweson ................................. 23/259.1 |
| 4,204,959 | 5/1980 | Kreuzburg et al. .............. 210/195.1 |
| 4,798,802 | 1/1989 | Ryan ................................... 422/184 |

OTHER PUBLICATIONS

Indianapolis Star, Feb. 3, 1991, "Towns turn to modern compost piles as alternative to incineration plants,"

Primary Examiner—Robert J. Warden
Assistant Examiner—Timothy M. McMahon
Attorney, Agent, or Firm—Woodard, Emhardt, Naugton, Moriarty & McNett

[57] ABSTRACT

An apparatus for the composting of fermentable organic refuse includes a rotating digester tube with a feed auger continuously providing refuse to the tube and a number of discharge outlets at the distal end of the tube. A number of agitating vanes extend along substantially the entire length of the interior of the digester tube, each vane including sections extending parallel to the axis of the tube and sections angled relative to the tube axis to assist in transporting the refuse along the tube. The digester tube is also provided with a number of air tubes extending along substantially the entire length of the tube and connected through a plenum to a blower at the distal end of the tube. Each of the air tubes includes a number of air openings therethrough for providing counter-flow air at each stage of the fermentation process within the tube. The air openings in each of a plurality of groups of openings are spaced at varying intervals to vary the amount of air flow from the air tubes into the tube at each of the fermentation stages. In one embodiment, the air tubes are affixed to the agitating vanes. In the use of the apparatus, the environment within the digester tube is controlled to optimize microbial growth and aerobic activity. A fan is provided to flow air over the exterior of the digester tube to control the temperature of the tube and its contents, particularly in the thermophilic stage of the fermentation process.

5 Claims, 4 Drawing Sheets

APPARATUS AND METHOD FOR PROCESSING ORGANIC REFUSE

BACKGROUND OF THE INVENTION

This invention refers to the processing of waste materials containing organic refuse, such as garbage or refuse from homes, kitchens, hotels, gardens, farms and various industrial facilities. More particularly, the invention concerns a method and apparatus for processing these waste materials by fermentation, decomposing the material into compost.

All modern industrial societies are facing increasing cost and difficulty in disposing of their enormous and increasing tonnage of solid waste and garbage in an environmentally sound and economically acceptable manner. Historically, refuse or garbage has been collected and disposed of by one of several inexpensive means, such as open burning, dumping in waterways or dumping in common landfills. As the ecological impact of these practices became evident, the demand for safer practices grew. Three methods have emerged as environmentally suitable means for safe refuse disposal: (1) sophisticated landfills with costly structures and controls designed to prevent leaching into surrounding ground water; (2) controlled incineration; and (3) composting in which the compost product has a reduced toxicity suitable for subsequent disposal in a landfill or use as fertilizer.

Microbial conversion of organic matter to compost is a natural phenomenon as old as biological matter on the planet. Composting has been used for agricultural purposes for hundreds of years. Only relatively recently has composting been used as an alternative method of handling community waste. In composting systems throughout the world, a host of classes and species of microorganisms are used to ferment a variety of organic materials. For instance, recent attention has been drawn to microorganisms adapted to decompose toxic organic materials, such as PCBs, in solid waste.

In one typical composting process, a chamber is filled with a waste material. Air is provided to the chamber to sustain the aerobic thermophilic fermentation process. The chamber is vented to prevent accumulation of $CO_2$ generated during the fermentation, since such accumulation may halt the process or cause the fermentation to become anaerobic. It is known that the fermentation process progresses in two microbiological stages. In the first stage the fermentation is dominated by thermophilic microorganisms. The second stage is characterized by mesophilic microbial activity and gradually decreasing temperature.

In spite of the simplicity and allure of composting techniques, typical systems are not easily adapted to large scale use in smaller communities. In some cases, the systems are too costly, often as much as $75,000,000 per system. Some systems employ exposed windrows of rotting garbage, which is certainly a nuisance for the local community. Still other systems require a prohibitive amount of time to fully decompose community waste.

In order to address the growing demands of community refuse disposal, a need exists for a fermentation or composting process and apparatus to inexpensively and efficiently process the refuse.

SUMMARY OF THE INVENTION

Composting or fermentation is a biological process and is subject to well-defined limitations for an optimum process. These limitations include: (1) the refuse must be organic in nature; (2) a suitable microbial population within the refuse or biomass; (3) the rate of microbial growth must be controlled, which affects the rate and efficiency of the process; (4) the size and nature of the microbial population must be controlled, which affects the capacity of the given operation; and (5) the environment for the fermentation must be controlled, which impacts the prior factors.

The process and apparatus of the present invention is intended to address each of these limitations. The invention is adapted for aerobic thermophilic (high temperature) fermentation and mesophilic (moderate temperature) fermentation in an elongated cylindrical digester tube as part of a biological waste material, or biomass, composting system. An aeration medium, such as air, is introduced throughout the digester tube by way of slotted air ducts to insure aerobic activity. Gases generated by the process are exhausted through the loading end. Counter-current air flow through the unit leads to optimum distribution of the air so that the fermentation process continues unabated throughout the biomass.

Since the waste material is not homogeneous when it is introduced to the digester tube, two methods are employed to introduce uniformity to the materials. The first is the use of an auger-type feed system which introduces a grinding and mixing action. The second is the agitation of material accomplished by rotating the digester tube.

The process of the present invention contemplates control and optimization of the variables that affect microbial growth, such as nutrient level, oxygen availability and temperature. These variables are controlled by enclosing the biomass in the digester tube and adjusting the quantities of various types of material added to the vessel.

Studies have shown that the best mix of nutrients results when the carbon to nitrogen ratio is 15:1 to 30:1 (parts carbon:parts nitrogen). Ratios lower than 15:1 result in excess nitrogen being given off in the form of ammonia, thereby causing odor problems. Ratios greater than 30:1 (and less than 50:1) can still result in a satisfactory compost; however, additional time is required to oxidize the excess carbon. Since typical community solid waste has a carbon to nitrogen ratio of 40:1 to 80:1, additional nitrogen bearing materials must be added to the compost for efficient operation.

Although many sources of nitrogen-bearing material are available, the present invention contemplates the use of liquid and dried sludges from wastewater treatment plants, which are a good source of nitrogen. One collateral benefit to the process of this invention is that many wastewater treatment plants are currently having difficulty finding a place to dispose of this sludge. Current regulated means of disposing of this sludge, such as land application and landfilling, are subject to many, sometimes onerous, constraints. Animal manures are also a good source of nitrogen. Many livestock operations are moving more toward confined feeding, which creates a waste disposal problem similar to that discussed for sludges.

Another consideration addressed by the process and apparatus of the present invention is the moisture content of the biological material in the digester tube. Inadequate moisture content can inhibit microorganism growth and slow the fermentation process. On the other hand, too high a moisture content also adversely affects the rate of microbial growth, primarily because the excess moisture adversely affects the mechanical properties of the waste material. In order for the microorganisms to breakdown the organic compounds, the porosity, texture and structure of the material must be optimized. The porosity of the material is a measure of the amount of space that is available for both moisture and oxygen retention. In addition, porosity affects the resistance of the mass to air flow. Structure is an expression of the rigidity of the particles. Refuse material with a high degree of structure will not settle or pack to as great an extent as material with little structure. The texture of the material determines the amount of surface area available for the aerobic activity. Most of the aerobic decomposition occurs on the surface of the material because the microorganisms utilize the oxygen available in a thin film at the surface of the waste material particles. Since the surface to volume ratio increases with decreasing particle size, small particle size will increase the efficiency of the decomposition process.

The present invention optimizes the biomass material porosity, texture and structure, which mechanical properties are all adversely affected by high moisture content. Porosity of the material can be lost when the moisture fills too much of the void space. A compost mass that is too wet will also lose its ability to crumble, resulting in an overall decrease of the surface area available for microbial growth. In addition, many of the materials found in community solid waste lose their structure when wet and therefore pack much tighter than would otherwise be the case.

To address these considerations, the present invention contemplates means for maintaining the moisture content at a level below which these adverse effects will be significant. It has been found as part of the invention that the optimum level for moisture control is then 40% to 60% water content in the waste material.

It is known that the amount of oxygen available to the microbial colonies is critical for aerobic growth. Therefore, the present invention provides means for controlling the air flow through the digester tube. Air flow affects several conditions within the tube, including moisture content, temperature, and the amount of oxygen being supplied to the microorganisms.

Aeration of the material is also affected by the amount and efficiency of the material agitation aspect of the invention. The agitation of the biological material must be sufficient to expose each of the particles to the air. The frequency of exposure should be such that the microbial growth is not stunted by lack of oxygen, or so frequent that the temperature of the biomass drops below that required by the colony. In addition, the agitation must not result in particle sizes so small that packing occurs.

Thus the digester tube includes means for agitation of the material, aeration of the biomass, aeration for drying the material, and breaking up the material into proper size particles. One means is to rotate the digester tube at a speed selected to expose the biomass surfaces sufficiently often to allow aerobic fermentation, but not so often to dry the material in the early to middle stages. Another means is vanes mounted within the vessel which operate to lift and break apart the biomass material to allow additional aeration. In one embodiment, the vanes run longitudinally through the digester tube and include dispersed angled portions between the loading post to the unloading end of the tube.

In the apparatus of the invention, the digester tube in one embodiment also includes circumferential vanes in the interior of the digester tube and spaced along its length to provide structural support for the digester tube.

To aid in aeration, the invention includes air tubes with air openings formed along each vane. In another embodiment, the air tubes are attached to the inner surface of the digester tube outer wall, rather than to the vanes. The length and spacing of the air openings is varied along the length of the digester tube to meet varying aeration demands in each section of the tube. In one embodiment, greater air is provided at the unloading area (distal end) of the digester tube to help dry the compost product to acceptable levels. An air inlet plenum is constructed across the distal end to supply the air tubes. The distal end is removable to allow access to the plenum for cleaning of the plenum and air tubes.

Air routed through the air tubes and out the air openings passes through the compost to facilitate drying, then continues through the digester tube to provide oxygen for the fermentation process. A counter-current air flow pattern provides the most efficient use of the air so that the highest concentration of oxygen occurs in the thermophilic phase where the fermentation process is most active.

In another aspect of the invention, the entire digester tube is enclosed so that air flow may be directed over the outer surface of the vessel to control temperature of the digester tube, particularly at the thermophilic phase. Thus, two separate air streams are provided, one through the digester tube introduced through the air plenum and air tubes, and the other around the vessel to control temperature.

The vessel is unloaded by means of openings in the distal end with sliding covers to control the rate the vessel is unloaded.

It is one object of the present invention to provide a method and apparatus for efficient processing of organic refuse, particularly using a composting or fermentation process. It is another object to provide such a method and apparatus that can be cheaply constructed and operated by small governmental or private entities.

Another object of the invention is to supply an apparatus that optimizes the operating parameters of the composting process so that complete fermentation of the organic refuse or biomass can occur in as little as three days. Other objects, and specific benefits, of the present invention will become apparent to persons of ordinary skill in this art from the following written description and accompanying figures.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
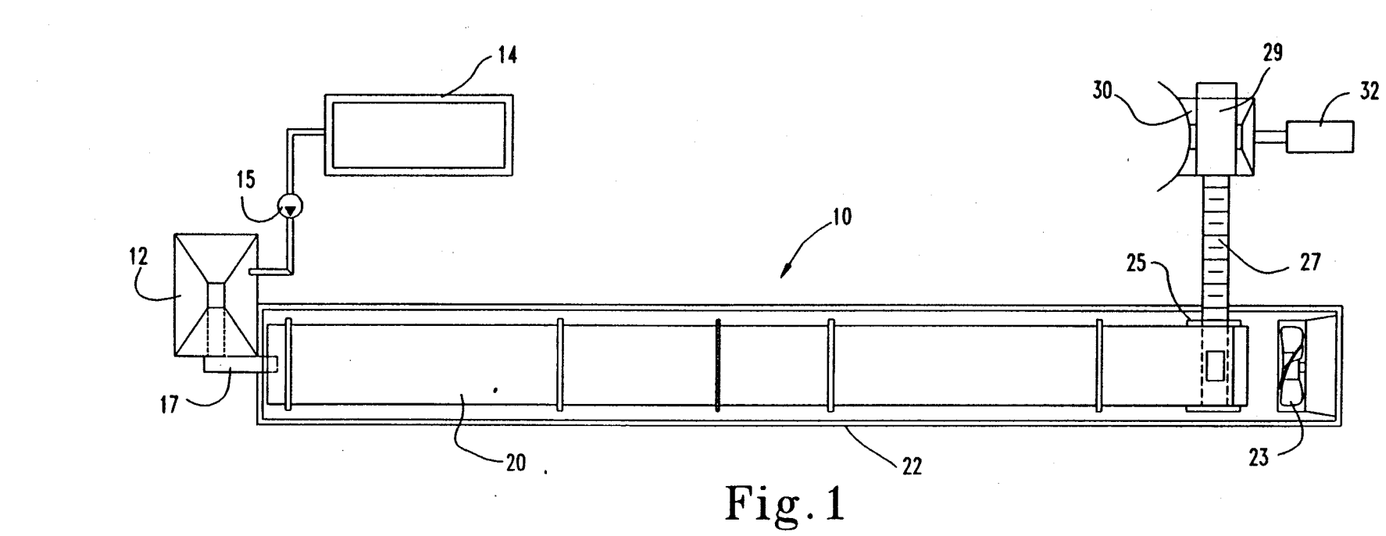
FIG. 1 is a top plan view of an industrial refuse processing system according to the present invention.

Referring to the plan view of FIG. 1, the refuse processing system 10 of the present invention includes a feed hopper 12 which receives organic or biomass waste and refuse. The organic refuse can be fed to the feed hopper 12 by a conventional conveyor system known in the art. Typically the biomass refuse has a carbon-to-nitrogen ratio of between 40:1 to 80:1, thus requiring the addition of nitrogen-bearing materials. A sludge tank 14 is provided to collect sludge that is fed by way of pump 15 to the feed hopper 12 to mix with the biomass refuse. In the preferred embodiment of the invention, the sludge comprises liquid sludge from a waste water treatment plant or other similar treatment facility. The sludge is added to the biomass refuse as a source of nitrogen. It has been found that liquid waste water treatment plant sludge has a nitrogen composition of 0.11%. Thus, although the disposal of the liquid waste water sludge is a beneficial use of that product of waste water treatment, it is frequently necessary to provide additional sources of nitrogen to mix with the biomass refuse. Consequently, the sludge tank 14 can be modified to accept animal manures and feed the animal manures to the feed hopper 12. Such animal manures may include poultry manure having a concentration of nitrogen at 6.3%, sheep or pig manure at 3.75%, or cow manure having a nitrogen content of 1.7%. Since animal manure typically is not readily flowable material, the sludge tank 14 can be modified, or a separate tank provided having means to convey the manure to the feed hopper 12 to mix with the biomass refuse. Likewise, dry wastewater treatment plant sludge, which typically has a nitrogen content of 6.5%, can also be fed through this modified or additional tank.

The sludge tank 14 can also be used to introduce additional water to the biomass refuse entering the refuse processing system 10. It has been found that in typical biological refuse, a water content of at least 40% is required for sufficient growth of the digesting microorganisms. Thus, water can be introduced through the sludge tank 14 and pumped by way of pump 15 into the feed hopper 12 to mix with the biomass refuse. It has been discovered in one aspect of the invention that the optimum level for moisture control in the material fed to through the processing system 10 is between 40% and 60% water content. Thus, the incoming refuse to feed hopper 12 is monitored to determine its water content and water is appropriately added through sludge tank 14 to increase the moisture content.

The refuse and other additives passing through feed hopper 12 falls to a feed auger 17 which conveys the biomass refuse material to a digester tube 20. The feed auger can be of standard screw-type construction, such as shown in the patent to Eweson, U.S. Pat. No. 3,245,759. The feed auger of the preferred embodiment has a length of four feet from the exit of the feed hopper 12 to the interior of the digester tube 20. The blades of the auger operate to break up the biomass material and to at least partially integrate the additives, such as water or other nitrogen bearing materials, with the biomass refuse prior to the fermentation process.

The fermentation or biological compositing of the refuse is accomplished within a digester tube 20. The digester tube 20 is substantially completely housed within an enclosure 22, such as a building designed to accommodate the tube. The enclosure 22 includes some means, such as a fan 23, for flowing air across the outer surface of the digester tube in order to cool the tube. The fan 23 in one specific embodiment has variable pitch blades to control the air flow across the tube 20. Control of the air flow is important to maintain the proper temperature within the tube 20 during the composting process, since aerobic fermentation is exothermic.

At the output end of the digester tube 20 is a discharge hopper 25 which collects the output from the tube and passes the compost product by way of a discharge conveyor 27 to an output hopper 30. The compost product passes through a Trommel screen to separate the compost product. Fine screenings are collected and taken to a compost storage area for distribution. Coarse screenings can be landfilled as waste. A nutrient tank 32 can be provided that feeds the output hopper 30 in order to supply the compost product with certain user-specified nutrients. For instance, when the fine screenings of the compost product are intended for agricultural use it may be desired to add certain nutrients to the compost to enhance its agricultural or fertilizing value.

Figure 2:
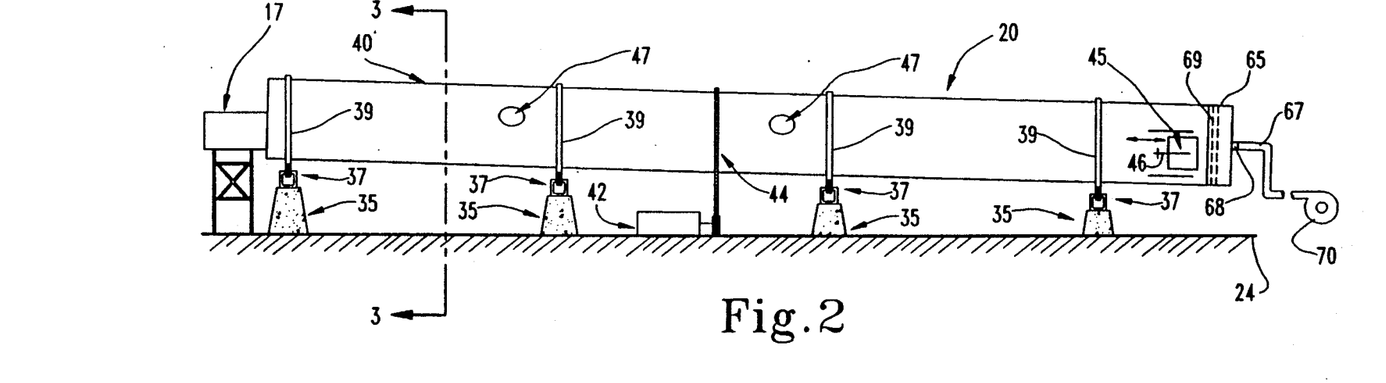
FIG. 2 is a side view of the digester tube used in connection with the system shown in FIG. 1.

The details of the digester tube 20 are shown more clearly in FIG. 2. The digester tube 20 is mounted on the enclosure floor 24 by way of a number of support piers 35. Each of these support piers carries a support roller assembly 37 which engages a support track 39 fixed to the outer shell 40 of the digester tube 20. The rollers 37 and support track 39 are uniformly disposed along the length of the digester tube 20 and act as bearings to permit the rotation of the tube about its longitudinal axis. The height of each of the piers 35 can be established to provide a certain angle for the digester tube 20. The angle of the tube assists in transporting the refuse material from the feed auger 17 to the discharge end of the digester tube. It is well known that a slight incline to the digester tube 20 permits gravity to assist in the transporting of the material. In the preferred embodiment, the height of each of the piers 35 is adjusted so that the digester tube is inclined at at an angle of approximately two degrees (2°) with respect to the floor 24.

A drive motor 42 is provided to rotate the digester tube 20 by way of a drive chain assembly 44. The drive chain assembly 44 includes teeth mounted or formed on the outer shell 40 of the digester tube 20 to engage links of a chain. In one specific embodiment, the motor is a 30 horsepower motor, which is sized to rotate a 12-foot diameter digester tube 20 that is 120 feet long at a rate of 1/5-$\frac{1}{3}$ rpm. Rotation of the digester tube 20 helps to transport the biomass material along the length of the tube and assists in exposing as much of the biomass material to air within the tube as possible.

At the discharge end of the digester tube 20 are a number of unloading doors 45. Preferably, there are four such doors 45 dispersed at 90 degree intervals around the outer shell 40 of the tube. A hand wheel mechanism 46 is provided with each of the doors to move the doors axially in the direction of the arrows for opening and closing. When it is desired to discharge compost product from the digester tube 20, the doors 45 can be manually opened so that the product falls by gravity through the lowermost door opening into the discharge hopper 25 (shown in FIG. 1). Gravity discharge reduces the energy requirements of the system 10 vis-a-vis prior art systems that use a discharge auger at the outlet of the digester. It is understood that in the preferred embodiment of the invention, the unloading doors 45 are not kept open except as required to discharge compost product, since the escape of air from the digester tube 20 may have deleterious effects upon the fermentation process.

The outer shell 40 of the digester tube 20 also includes a number of inspection access openings 47. These openings provide manual access for sampling the biomass material as it progresses along the length of the digester tube. The access openings can be located at various locations along the length of the tube 20, depending upon the phase of the composting process reached at the specific station along the tube length. Samples taken through the inspection access openings 47 can be used to determine whether a change in air flow is required, additional nitrogen or water is necessary, or a change in speed of rotation is needed, for instance. Each of the parameters contributing to optimum microbial growth and fermenting can be assessed by way of samples taken through the access openings 47.

Figure 3:
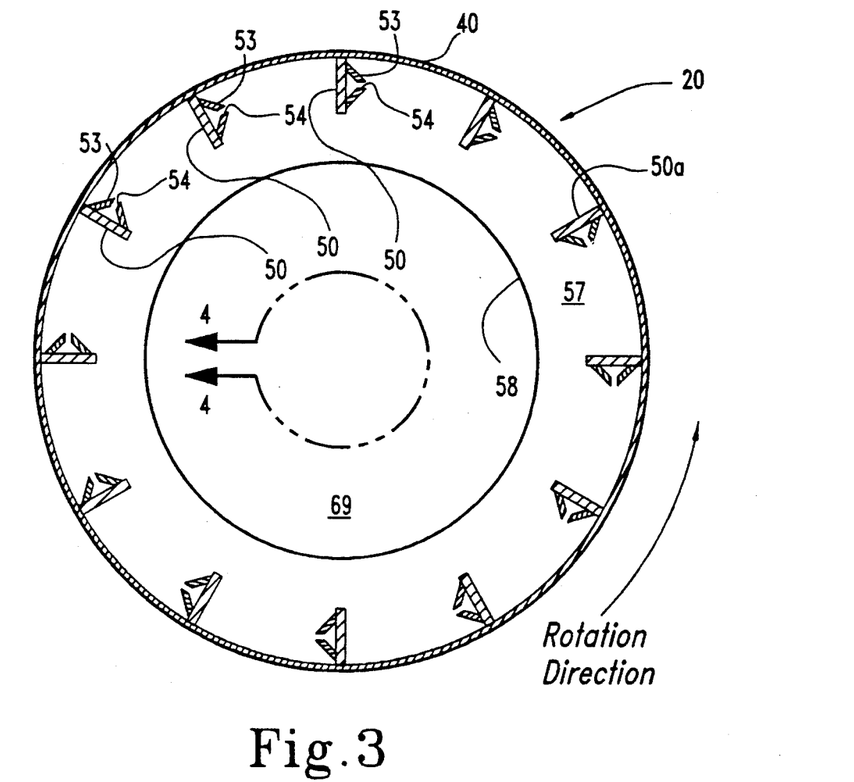
FIG. 3 is a cross-sectional view of the digester tube shown in FIG. 2 as taken along line 3—3 and viewed in the direction of the arrows.
Figure 4:
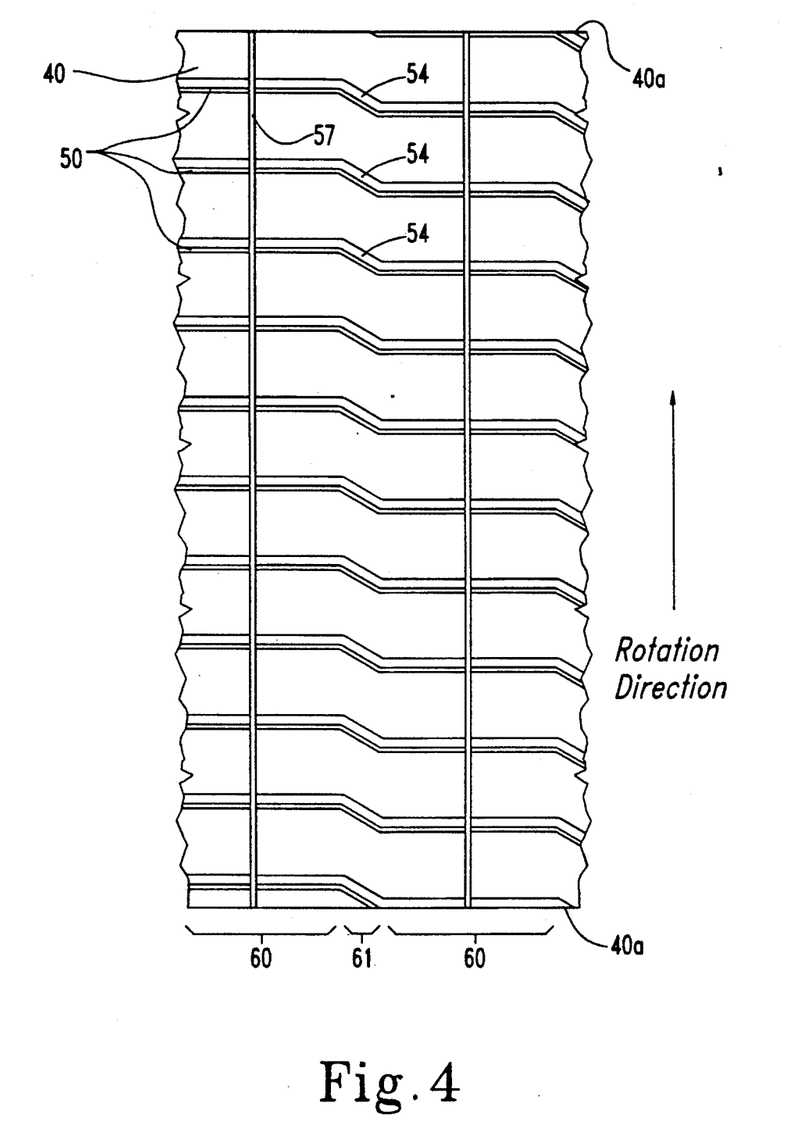
FIG. 4 is a circumferential view from the interior of the digester tube as shown in FIG. 3, taken alone line 4—4 and viewed in the direction of the arrows.

The interior of the digester tube 20 is shown in more detail in FIGS. 3 and 4. In particular, a number of lifting vanes 50 are fixed to the inner surface of the outer shell 40 of the tube 20. Each of the lifting vanes projects generally radially inward from the outer shell 40, as shown in FIG. 3. The vanes serve to lift the biomass material as the digester tube 20 rotates in the direction indicated. As the biomass reaches a point where it falls off the vanes, the material tends to break up thereby allowing additional aeration of the biomass material. Moreover, the lifting vanes 50 tend to help transport the material along the length of digester tube 20. In the preferred embodiment, the vanes 50 have a radial length of about one foot, for a digester tube 20 having an outer diameter of about 12 feet.

With respect to the diameter of the digester tube 20, it has been found as part of present invention that the distance of free fall of the biomass material through the air stream within the tube, as the material falls from the lifting vanes 50, should be at least three feet. The biomass material will typically fall from the vanes 50 when the vane reaches approximately 30 degrees from the vertical, in other words at vane location $50_A$ as shown in FIG. 3. It must be pointed out that in the preferred embodiment of the process of the invention, the digester tube 20 is filled to 50% or less. Thus, the material falling from vane $50_A$ does not fall to the lowermost portion of the outer shell 40, but to the surface of the biomass material half filling the digester tube 20. A twelve foot diameter for the digester tube 20 accommodates this three foot fall for agitated biomass in a half-filled tube. It is understood, however, that the distance of free fall of the material increases as the friction between the vane and the biomass material increases, which characteristic depends upon the type of biomass material fed through the digester tube 20.

Referring next to FIG. 4, one important aspect of the invention is illustrated. It is understood that FIG. 4 is essentially a circumferential view from the interior of the digester tube 20 as if the outer shell 40 had been cut along line $40_a$ and opened onto a flat surface. Thus, each of the lifting vanes 50 are depicted in FIG. 4 as longitudinally or axially extending vanes from end to end of the tube. According to the invention, the lifting vanes are broken into longitudinally extending portions 60 separated by angled portions 61. The angled portions 61 are preferably oriented at 30–45 degrees to the longitudinal axis of the digester tube 20. In the preferred embodiment, each longitudinally extending portion 60 is approximately 8 feet in length, while each angled portion 61 is approximately two feet in length.

The angled portions 61 of the lifting vanes 50 increase the ability to transport the biomass material along the length of the digester tube 20. Use of angled portions 61 also reduces the angle of inclination of the digester tube 20 required to efficiently convey the biomass to the discharge end. Consequently, these angled portions 61 occur every 8 feet along the entire 120 foot length of the digester tube 20 in the preferred embodiment.

Referring again to FIG. 3, the digester tube includes a number of circumferential vanes 57, each having a center opening 58 to permit the passage of biomass material therethrough. The circumferential vanes 57 provide strength and stability to the outer shell 40 of the digester tube 20. Consequently, only a few circumferential vanes are necessary and the vanes can be dispered at wide intervals along the length of the digester tube 20. The vanes 57 also help agitate or break up the biomass material as it passes through the center opening 58. In the preferred embodiment, each circumferential vane 57 has a radius or radial height of about two feet for a twelve foot diameter tube 20. The tilt of the tube 20 allows the biomass to fall through the eight foot diameter opening in each circumferential vane 57. In one embodiment, the vanes 57 are spaced at 30 foot intervals along the 120 foot length of the digester tube 20.

In another important aspect of the invention, the lifting vanes 50 include an air tube 53 fixed to the surface of the vane. Each of the air tubes 53 include an air slot 54 that continues longitudinally along the entire length of a lifting vane 50 from the input end to the discharge end of the digester tube 20. The width of each of the slots 54 and each of the air tubes 53 is calibrated to provide the proper amount of air flow into the digester tube 20. It has been found pursuant to the present invention that the air tubes 53 as mounted on the lifting vanes 50 provide the optimum aeration of the biomass material as it travels along the length of the digester tube 20. The air tubes 53 provide air at the outer circumference of the digester tube 20, which is the best location for fully aerating all of the biomass material. Moreover, since the air tubes 53 are located on the back face of the lifting vanes 50 with respect to the direction of rotation (the front face contacting and lifting the biomass), the air slots 54 are less likely to become blocked by biomass material, which could restrict the air flow into the digester tube 20. Moreover, the triangular cross-section of the air tube 53 enhances the ability of the tube to shed biomass material that impacts the air tube, causing the material to fall away from the air slot 54. Situating the air opening 54 at the apex of the triangular air tube, as shown in FIG. 3, further restricts the ability of biomass material to fall into or block the air slot.

In the preferred embodiment, the width of the opening of the air slot 54 in each of the air tubes 53 is approximately one-quarter inch (¼"). It has been found that an air slot opening of this dimension is large enough to avoid being clogged by the typical particle size of biomass material in the digester tube 20. The width of the air slot 54 can be varied along the length of the air tube 53 to control the amount of air fed to different locations along the length of the digester tube 20. The air flowing through the air tubes 53 and through each air slot 54 passes in a counter-flow direction to the direction of advancement of the biomass material through digester tube 20. In other words, the air flows from the discharge end to the inlet end of the digester tube and exits through the opening provided for the feed auger 17. In this manner, the air is optimally distributed throughout the length of the digester tube 20.

Referring to FIG. 2, air is provided to each of the air tubes 53 by way of an air inlet plenum 65 fixed at the discharge end of the digester tube 20. The plenum 65 is fed by way of an air inlet pipe 67 which is connected to the plenum by way of a swivel fitting 68. Thus, the air inlet pipe 67 can remain fixed to a source of pressurized air while the digester tube rotates about its longitudinal axis. Air from a blower 70 is fed through the air inlet pipe 67 to the plenum 65 to be distributed to each of the air tubes 53. The blower 70 can be a rotary positive displacement blower having an output capability of about 3500 cfm for a 100 ton/day compost production rate, for example. The air inlet plenum 65 includes a distribution plate 69 that closes the plenum 65 from the interior of the digester tube 20. The plenum includes a number of openings identically corresponding to each of the air tubes 53. Thus, air is fed to the digester tube 20 solely through the inlet pipe 67, distribution plate 69 and air tubes 53. Preferably, the air inlet plenum 65 is adapted to be removed for cleaning the air tubes 53 as well as the plenum itself. While air is disclosed as the aeration medium of the preferred embodiment, other media known in the art can be used, such as pure oxygen. Naturally the selected aeration medium must contain the oxygen required for the aerobic fermentation activity. The use of media other than air will necessarily require some modification of the medium flow rates relative to the oxygen content and other properties of the medium that impact the fermentation process.

It is understood that while each vane 50 is shown in FIG. 3 as including an air tube 53, it is also possible to reduce the number of air tubes throughout the length of the digester tube. The number of air tubes 53 depends upon the air flow requirements for a particular type of organic waste, and upon the blower output. The invention also contemplates varying which of the plurality of air tubes 53 is fed through the distribution plate 69 of the air inlet plenum 65.

Figure 5:
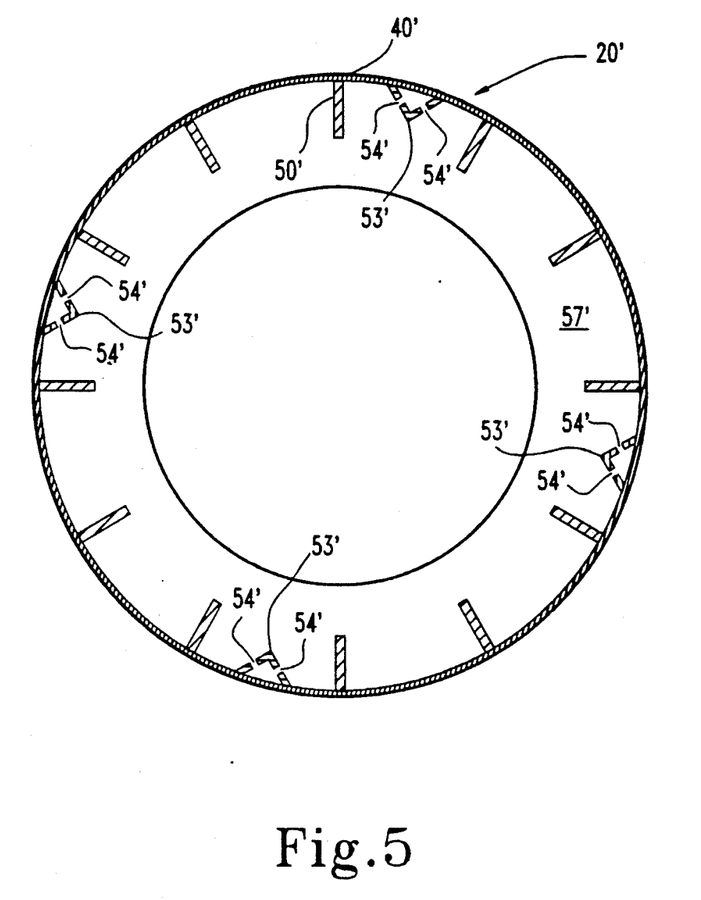
FIG. 5 is a cross-sectional view, similar to the view in FIG. 3, of a digester tube according to an alternative embodiment of the present invention.

While an single air slot 54 has been shown along the length of each air tube 53, it is preferably that the slot be replaced with a number of discrete air openings (such as the openings 54' shown in FIG. 5). The location of the separate openings can be varied in a manner set forth below in order to vary the air flow at different sections along the length of the digester tube 20.

In an alternative embodiment, illustrated in FIG. 5, a digester tube 20' includes an outer wall 40' within which is mounted a number of radial vanes 50' and circumferential vanes 57'. Unlike the digester tube 20 of the prior embodiment, the vanes 50' of the tube 20' do not carry their own air tubes. Instead, a number of air tubes 53' are dispersed at 90 degree intervals around the tube and are situated between vanes 50'. The air tubes 53' are again triangular in shape and include air openings 54' in each leg of the triangular tube. Each opening 54' is nominally ¼ inch in width and length. It is understood that the openings 54' can be provided in the air tubes 53 of the previous embodiment.

In an important aspect of the present invention, air flow into the digester tube 20 or 20' is controlled according to the phase of the fermentation process encountered at locations along the length of the tube. According to the process of this invention, greater air flow is required at the distal (discharge) end of the digester tube than at the proximal (inlet) end. The air flow affects moisture content, oxygen availability and temperature within the tube. Optimization of air flow at various stages along the digester tube length is therefore critical to an improved process. Too little air flow at certain phases of the fermentation process can starve the microbes and stunt microbial growth. Too much air flow can dry out the biological refuse material and decrease the biomass temperature below the level required by the digesting microbes.

In the present invention, the rate at which the biomass moves along the length of the digester tube is generally constant, which permits the use of a simpler tube structure than many prior art devices (such as multi-chambered apparatus). Moreover, the rate at which the biomass is agitated or exposed to the air by way of the lifting vanes is also generally constant throughout the digester tube. Consequently, variations in air flow or oxygen levels at locations along the digester tube 20 or 20' is optimally accomplished by changes in the air tubes 53/53' and air openings 54', and more specifically in the combined area of the air openings 54' in certain sections along the digester tube length.

According to the present invention, the fermentation process accomplished by the digester 20/20' can be divided into a mesophilic (moderate temperature) phase at the proximal third of the tube (i.e., first 40 feet), a thermophilic (high temperature) phase at the middle portion (second 40 feet), and a drying phase at the distal portion of the tube (last 40 feet). Since the air flow through the digester tube 20/20' and air tubes 53/53' is counter-flow, from distal to proximal end, the blower air is efficiently used to provide the highest concentration of oxygen in the mesophilic and thermophilic phases where the fermentation process is most active. In the drying phase at the distal third of the tube the fermentation process is largely complete and the air functions primarily to dry the generally mature compost and carry heat away from the material.

In the mesophilic phase, the microbial reactions are beginning and the biomass temperature gradually increases from about ambient to 110° F. at the beginning of the thermophilic stage, since the aerobic microbial growth is exothermic. In the thermophilic phase, a greater amount of oxygen is required to sustain the microbial colonies, and greater air flow is necessary to maintain the temperature of the biomass. Air is supplied to the material in the thermophilic zone through the air openings 54' located in the zone, as well as through the counter-flow air passing from the distal drying zone into the middle thermophilic zone.

In the preferred embodiment, the air flow profile along the length of the digester tube is controlled by the spacing of the groups of air openings in each section, with each air opening having the same dimensions and flow area. In the distal drying section of the preferred embodiment, the air openings are spaced at 2½ inch intervals, as measured from the center of the openings. In the thermophilic, or middle, section, the opening spacing is 5¼ inches. At the proximal, or mesophilic, section, the openings are located every 11 inches on center. Although the air opening spacing in the proximal mesophilic stage is much more sparse than the other two stages, counter-flow air from the subsequent stages also flows into the mesophilic stage. However, since the greatest amount of microbial growth occurs in intermediate thermophilic stage, much of the oxygen in the counter-flow air is absorbed by the thermophilic microbes. Moreover, carbon dioxide ($CO_2$), which is a by-product of the fermentation process, is conveyed by the counter-flow air through the mesophilic stage to exhaust out the feed end of the digester tube 20 or 20'. Flow of $CO_2$ through the biomass tends to limit microbial growth, which controls the temperature rise in the mesophilic stage.

In a novel improvement over prior apparatus for fermentation, the present invention relies upon air tubes extending along substantially the entire length of the digester tube, and upon air opening spacing to control air flow into the different regions of the fermentation process. Fundamentally, the spacing of fixed flow area openings in each of the three regions within the digester tube determines the total flow area for the particular region. For example, in the distal 40 foot drying section, the 2½ inch spacing provides about 190 openings in that section. In the middle thermophilic section about 90 openings are spaced at the 5¼ inch intervals, while only about 45 openings are present in the proximal 40 foot mesophilic section. It is thus apparent that the opening spacing leads to reduced total flow areas between the three sections, assuming that each of the openings 54' is of consistent dimension and flow area.

The approach provided by the present invention supplants the prior devices and processes that either simply provide a constant counter-flow of air from end to end, or that rely upon compartments to control air flow between sections. In the preferred embodiment, the opening spacing, and consequently the total air flow area, in consecutive sections is approximately twice the spacing in the prior section. It has been found that this relationship of opening spacing provides the optimum proportion of air flow and oxygen to each of the three phases of the fermentation process—mesophilic, thermophilic and drying. This proportion remains substantially constant even as the speed of the air from the blower 70 (FIG. 2), or the air flow rate, is increased or decreased.

In a variation of the preferred embodiment, the same total flow area reduction from distal to proximal end can be accomplished with uniform opening spacing by reducing the size of the groups of openings in each of the three sections. The flexibility of the approach of the present invention also permits non-uniform variations in opening spacing or opening dimensions along the entire length of the digester tube. For instance, the opening spacing within a given section, such as the thermophilic section, can be linearly varied within the section to more precisely account for the addition of counter-flow air at the more proximate portions of the thermophilic section. The invention further contemplates that each group of openings corresponding to a fermentation section includes a single opening, or slot. In this variation, the widths of the slots at each section is varied between sections to achieve the same total flow area arrangement attained by the former embodiments.

In the process of the present invention, organic refuse or biomass is introduced into the feed hopper 12. The nitrogen content or carbon/nitrogen ratio of the refuse can be measured prior to introduction to determine how much additional nitrogen must be added to the refuse to bring the carbon/nitrogen ratio to between 30:1 to 50:1. Nutrients or nitrogen bearing material can be added in molal proportions depending upon the type of additive and its nitrogen content. For liquid nutrients, such as liquid sludge, the additive material can be introduced into the hopper 12 by way of the sludge tank 14.

It has been found that for most municipal waste, no inoculation of microorganisms is necessary to establish a suitable microbial population to initiate a self-sustaining composting or fermentation process within the digester tube, once air, water and other nutrients have been added to the material. However, microorganisms suitable for breaking down the organic material can introduced on the surface of the solid waste at the feed hopper 12.as it is added to the digester tube. For instance, a group of microorganisms called actinomycetes can be inoculated, which microbes become the dominant microorganism present in the biomass as the temperature rises. Other types of aerobes can be added to the organic refuse as required by the type of waste material being fermented. For example, in one application of the present invention, toxic organic waste from a contaminated site can be processed by the present invention. In some instances, it can be necessary to inoculate the toxic organic waste, such as motor oil, hydrocarbons and PCBs, with recently discovered microorganisms capable of decomposing. However, is has been found that the apparatus and process of the present invention permits substantial decomposition of many toxic organic wastes when these toxic materials are combined with ordinary municipal refuse. The strict environmental control maintained within the digester tube permits the microbes naturally occurring in the municipal refuse to decompose the toxic wastes. It has further been found that the present invention is capable of fermenting at least 90% of the toxic organic waste by increasing the residence time of the waste within the digester tube by only a few days.

The auger 17 controls the rate of introduction of the waste and additive material into the digester tube 20 or 20', while also mixing the biomass and the added nutrient material. Preferably, the auger 17 conveys the material into the digester tube to a point at which the tube is half filled. The angle of inclination controls the rate of gravity feed of the material away from the auger 17 and along the length of the tube, with assistance from the longitudinal vanes 50 or 50' as the material is lifted during rotation of the tube 20/20'. The feed rate of the auger 17 and the rotation rate of the digester tube are mutually calibrated to maintain the half filled biomass level throughout most of the length of the tube. The length of the tube, together with the rotation rate, controls the length of time that the biomass is in the digester tube. Using the present invention, it has been found that typical municipal waste can be decomposed to a mature compost in about three days in a 120 foot long digester tube. Shorter times can be achieved in refuse having low concentrations of wood-based waste.

The unloading doors 45 are periodically opened to dump the compost product by gravity into the discharge hopper 25 for conveyance to the output hopper 30. To a lesser degree, the size or area of the unloading doors contribute to the residence time of the biomass within the digester tube. In the preferred embodiment, the unloading doors 45 are four feet square for a twelve foot diameter tube.

Fine compost particles pass through the Trommel screen 29 and are subsequently stored for distribution. Coarse particles, which are generally unusable for agricultural purposes, can be landfilled as waste. However, in the operation of the system and process of the present invention, these unusable coarse particles amount to only about 10% of the original organic waste volume for typical municipal waste. However, waste having all high-grade organics will generally produce no unusable coarse particles. The usable compost will typically amount to 50–70% of the original volume, depending upon the grade of the incoming waste material. The remainder of the waste volume is lost in heat and $CO_2$ emission.

In the preferred method, the air flow rate provided by the blower 70 into the plenum 65 is 3500 cfm. This flow rate provides optimum air flow through the air openings 54' at the different fermentation zones. The temperature and pH of the biomass is measured through one of the access ports 47, typically through the downstream port in the thermophilic, or middle, section of the digester tube 20 or 20'. Both parameters provide a measure of the rate of microorganism growth and their aerobic activity, which can be compared to empirical data for optimum fermentation. The need to change moisture content, air flow, or tube rotational speed can then be assessed. Changes in the speed of motor 42 rotating the tube 20 or 20' can increase or decrease the amount of time that the biomass material spends in each phase of the fermentation process, and more particularly the time over which the biomass is exposed to a particular temperature and air flow.

If additional moisture is required, water can be added through the sludge tank 14 or directly into the feed hopper 12 to be mixed with the biomass. It is contemplated that some water will be continually added to all refuse introduced to the digester tube to achieve a 40–60% moisture content in the material. However, as required the moisture content can be interactively controlled by increasing or decreasing the rate of water flow into the system. The addition of water during the fermentation process can reduce the need to adjust the air flow below optimum levels (for example, as established by oxygen requirements).

In a similar manner, the air flow from blower 70 can be adjusted as required according to the pH or temperature at the access port 47 compared to the empirical optimum value at that stage in the fermentation process. The pH value of the biomass material is an indicator of the rate of aerobic activity of the microbial colonies. Changes in air flow lead to changes in oxygen provided for microbe growth and activity, which lead to changes in alkalinity of the material. Comparison of the pH value with an expected range of empirical values can be translated to necessary changes in oxygen provided to the material, and ultimately to changes in air flow.

Further variations in air flow, provided the pH falls within the required range, can be provided to maintain the temperature in the thermophilic region. It is known that most aerobes or aerobic microbes die at temperatures exceeding 175° F. Thus, it is essential that the temperature in the thermophilic regions, in which the material experiences the greatest temperature increase, is carefully monitored and controlled throughout the continuous composting process. To some degree, air flow within the digester tube 20 or 20' can be manipulated to control the tube temperature. However, changes in air flow can also produce changes in other parameters of an optimum fermentation process. For instance, air flow across the agitated refuse particles can remove moisture from the particles by evaporation, which is desirable in the distal drying stage but undesirable in the middle thermophilic region. Also, too much cooling effect provided by the air flow can counteract the natural temperature increase associated with the aerobic fermentation process, thereby slowing or stopping the aerobic activity.

Thus, it has been found that simply controlling the air flow through the air openings 54' generally does not entirely maintain the thermophilic temperature, nor is it desirable to rely solely upon internal air flow for cooling the biomass in the thermophilic region. Another means for temperature control in the thermophilic range is provided by way of the fan 23 blowing air across the outer shell 40 of the digester tube 20 or 20'. Changes in this external air flow are accomplished in the preferred embodiment by varying the pitch of the fan blades. Changes in air flow over the tube controls the amount of heat carried by convection away from the outer shell, which controls the rate at which heat is dissipated within the digester tube itself.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for making compost from organic refuse containing fermentable materials, the apparatus comprising:

an elongated cylindrical container having a circumferential inner surface and a longitudinal axis;

feed means for feeding the organic refuse into said container at one end of said container;

discharge means at the opposite end of said container for discharging the fermented refuse as compost;

support means for rotatably supporting said container such that the longitudinal axis of said container is inclined at an angle relative to the horizontal; and drive means for rotating said container about its longitudinal axis, whereby the refuse within said container is transported along said container by rotation of said container from said one end to said opposite end of said container;

aeration means for flowing an aeration medium through said container; and agitating means for agitating the organic refuse as it is transported through said container, including a number of lifting vanes affixed to the inner surface of said container, wherein each of said number of vanes projects generally radially inward and extends along substantially the entire longitudinal length of said container, further wherein each of said number of lifting vanes includes a number of first portions extending generally parallel to the longitudinal axis of said container and a number of second portions integrally disposed between adjacent first portions, said second portions being angled relative to the longitudinal axis of said container to assist in transporting the refuse through said container as the container rotates.

2. The apparatus for making compost of claim 1, wherein each of said second portions is angled at an angle of between 30 and 45 degrees relative to the longitudinal axis of said container.

3. The apparatus for making compost of claim 1, wherein said aeration means includes a number of tubes connected to the inner surface of said container between adjacent vanes, each of said tubes including a number of openings therethrough for communicating the aeration medium into the interior of said container.

4. The apparatus for making compost of claim 1, wherein said aeration means includes a number of tubes, one each of said number of tubes being affixed to and generally coextensive with one of said number of vanes, each of said number of tubes including a number of openings therethrough for communicating the aeration medium into the interior of said container.

5. The apparatus for making compost of claim 1, wherein said agitating means further includes a number of circumferential vanes attached to the inner surface of said container and extending radially inward, each of said number of circumferential vanes having a central opening therethrough for the passage of the organic refuse as it is transported along the said container.

* * * * *